United States Patent [19]

Kidd

[11] 4,161,840
[45] Jul. 24, 1979

[54] FISH HOOK

[76] Inventor: David B. Kidd, 5820 Hillsboro Rd., Nashville, Tenn. 37215

[21] Appl. No.: 794,717

[22] Filed: May 9, 1977

[51] Int. Cl.² .............................................. A01K 83/00
[52] U.S. Cl. ................................... 43/43.4; 43/44.92; 43/37
[58] Field of Search ............... 43/43.4, 44.85, 43.16, 43/44.92–44.94, 44.87, 34, 37, 6

[56] References Cited

U.S. PATENT DOCUMENTS

| | | | |
|---|---|---|---|
| 1,791,083 | 2/1931 | Pike | 43/34 |
| 2,123,598 | 7/1938 | Eliason | 43/43.4 |
| 2,163,378 | 6/1939 | Horvath | 43/42.13 |
| 2,260,923 | 10/1941 | Thompson | 43/34 |
| 2,501,210 | 3/1950 | Cretin | 43/43.16 |
| 3,036,395 | 5/1962 | Nelson | 43/6 |
| 3,293,791 | 12/1966 | Hinkson | 43/448 S |
| 3,952,444 | 4/1976 | Hämeen Anttila | 43/34 |

FOREIGN PATENT DOCUMENTS

| | | | |
|---|---|---|---|
| 1085713 | 7/1954 | France | 43/43.16 |
| 21260 | of 1904 | United Kingdom | 43/43.16 |
| 791467 | 3/1958 | United Kingdom | 43/43.16 |

*Primary Examiner*—William Pieprz
*Attorney, Agent, or Firm*—Abe Hatcher

[57] ABSTRACT

Concealable two-part fish hook comprising shaft and hook held to the shaft by an oval loop.

6 Claims, 7 Drawing Figures

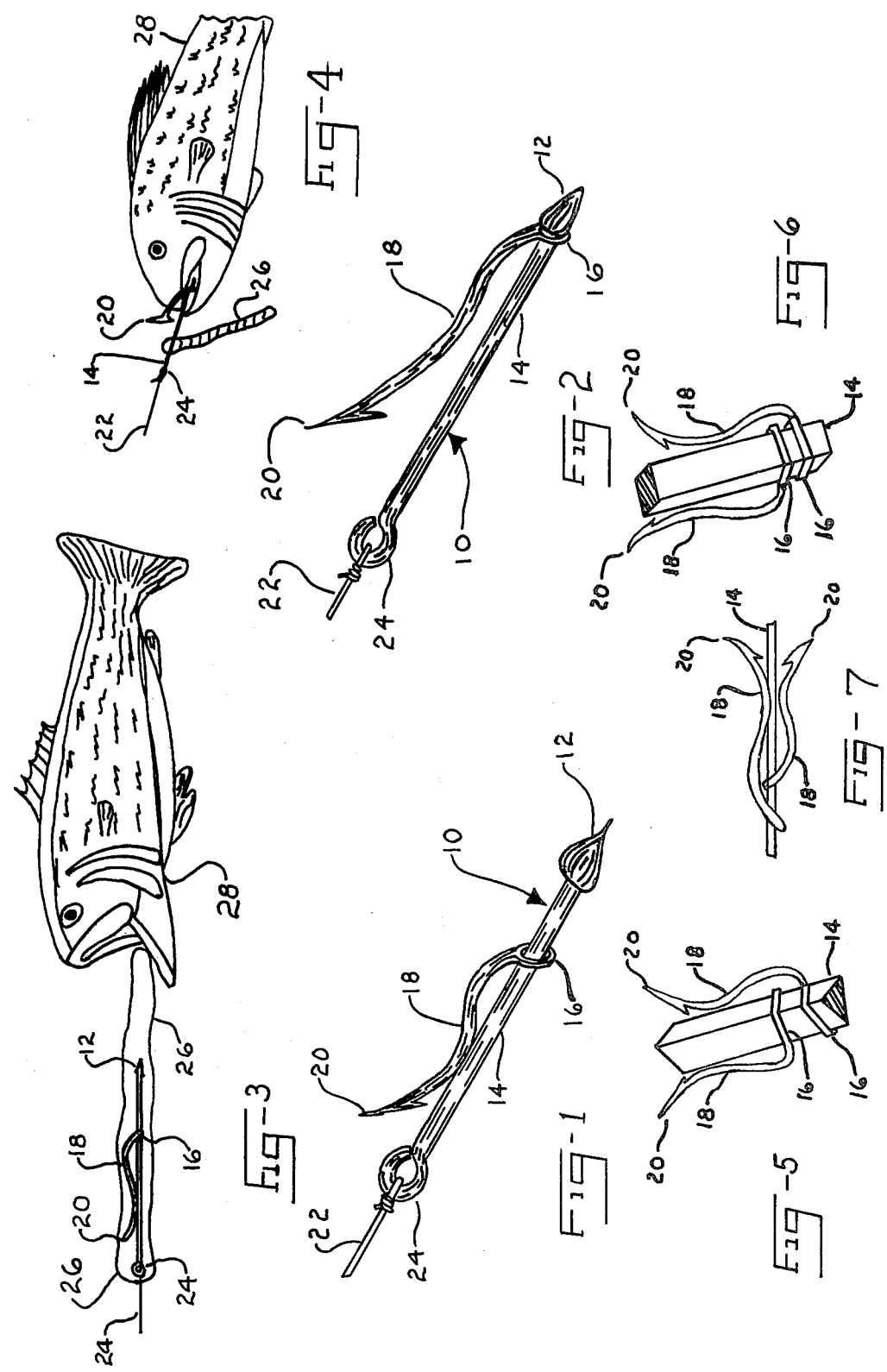

FISH HOOK

BACKGROUND OF THE INVENTION

1. Field of the Invention

This invention relates to fishing. More particularly, it relates to a fish hook made up of two parts, specifically, a shaft and a hook which fits around the shaft by means of a loop at one end of the hook.

2. Description of the Prior Art

Up until now there has been no hook on the market which can be completely concealed from a fish and which assures hooking of the fish.

SUMMARY OF THE INVENTION

After extended investigation, I have developed a fish hook which is concealable in live bait or plastic lure such as a worm so that a fish, seeing the bait but not the hook, is more likely to bite at the bait. In its broader aspects, my invention comprises a fish hook sufficiently flat to be inserted inside a worm-like bait or artificial lure and made up of a shaft and at least one barbed section or hook which lies close to the shaft along part of its length and fits against said shaft by means of a loop at the end of the barb or hook opposite its pointed, barbed or hooked end. The loop at the end of the hook or barbed section fits around the shaft loosely enough that it will flip outward when the line becomes taut and the bait reaches the mouth of the fish to be caught but will not turn around the shaft. When the shaft is circular in cross section the looped end of the hook portion is preferably oval in shape so that it will flip upward and catch in a fish's mouth when being caught but will not wobble about the shaft. When the shaft is of triangular or rectangular cross section, several hooks or barbs may be placed along its length pointing outward from different sides. The hook is preferably curved so as to present an at least slightly circular angle so that it will more readily become embedded in the fish's mouth when flipped outward, instead of slipping along the inner surface of the mouth.

DESCRIPTION OF THE DRAWING AND OF THE PREFERRED EMBODIMENT

For a better understanding of my invention reference will now be had to the drawing which, together with the description thereof, represents a preferred embodiment of the invention.

In the drawing,

FIG. 1 is a perspective view of the hook of the invention taken from the end opposite the pointed end of thehook and at an angle, the barb or barbed section being shown lying down against the shaft.

FIG. 2 is a perspective view similar to that of FIG. 1 except that the barb or barbed section is shown in elevated position instead of lying against the shaft.

FIG. 3 is a schematic diagram showing a hook according to the invention concealed inside a lure or bait just before being bitten by a fish.

FIG. 4 is a schematic diagram such as that of FIG. 3 except for showing the hook embedded in the fish's mouth after the fish takes the bait.

FIG. 5 and FIG. 6 illustrate shafts of respective triangular and rectangular cross sections, each having more than one hook looped thereagainst.

FIG. 7 depicts perspectively a portion of a fish hook from the side having more than one barb joined thereto.

In FIGS. 1 and 2, fish hook 10 is made up of a shaft 14 and at least one hook, barb or barbed section 18. The shaft has a pointed end 12 opposite an eyelet-type end 24 to which a line such as 22 may be tied. Hook 18 has a looped end 16 by which it is attached to shaft 14 and a pointed spearlike barbed opposite end 20.

In FIGS. 3 and 4 are shown additionally a lure or bait 26 and a fish 28.

My fish hook may also have a shaft that is rectangular or triangular in cross section so that 2, 3 or 4 hooks may be positioned at various positions along the shaft.

An added advantage of my fish hook is that when the line is pulled and the fish bites, the thrust forces the barb of the hook out into the fish's mouth. The shaft is preferably at least one-third again longer than the hook or barbed section to aid in stabilizing control of its point when the hook is set or pressure is on the hook. Also, the hook should preferably be held tightly enough by its looped end to prevent it from opening to an angle from the shaft of greater than 30°.

While the invention has been described in terms of preferred embodiments, the claims appended hereto are intended to encompass all embodiments which fall within the spirit of the invention.

Having thus described my invention and certain preferred embodiments thereof, I claim:

1. A fish hook comprising at least one S-shaped hook member with a barb at one end thereof and an other end, a linear shaft having a first end and a second end, said second end having means thereat for attachment to a fishing line, said hook member being attached to said shaft such that said barb rests against said shaft and the other end of said hook member being sufficiently loosely fitted around said shaft for the hook member to lift up and be forced out into a fish's mouth when the fish bites, said S-shaped hook member extending generally along the length of said shaft and with the barb pointing outward but generally toward the second end of said shaft hook member and said shaft, and said hook member and said shaft being completely concealable inside a worm lure.

2. The fish hook of claim 1 wherein the other end of the hook member opposite said barb is looped around said shaft.

3. The fish hook of claim 1 wherein the shaft is circular in cross section and said other end is looped around said shaft in an oval manner whereby it will not turn around said shaft but will lift upward in catching a fish.

4. The fish hook of claim 1 concealed with a lure.

5. The fish hook of claim 1 wherein the shaft is at least one-third longer than the hook member.

6. The fish hook of claim 1 wherein the hook member is incapable of opening to an angle of greater than 30° from the shaft.

* * * * *